(12) United States Patent
Hirayama et al.

(10) Patent No.: US 6,879,592 B1
(45) Date of Patent: Apr. 12, 2005

(54) SWITCHING SYSTEM AND SWITCHING CONTROL METHOD

(75) Inventors: Koji Hirayama, Chigasaki (JP); Haruo Shibata, Yokohama (JP); Akio Kawase, Yokohama (JP); Shinichi Iwaki, Kamakura (JP)

(73) Assignees: Hitachi, Ltd., Tokyo (JP); Hitachi Communication Systems, Inc., Yokohama (JP)

( * ) Notice: Subject to any disclaimer, the term of this patent is extended or adjusted under 35 U.S.C. 154(b) by 0 days.

(21) Appl. No.: 09/516,162

(22) Filed: Feb. 29, 2000

(30) Foreign Application Priority Data

Mar. 3, 1999 (JP) .......................................... 11-054959

(51) Int. Cl.[7] .............................................. H04L 12/56

(52) U.S. Cl. ..................... 370/395.1; 370/419; 370/463; 370/466

(58) Field of Search ................................ 370/464–476, 370/463–469, 409–410, 419, 396, 389, 351–352, 395.1, 395.5, 395.6, 395.62, 395.63, 395.64, 395.65

(56) References Cited

U.S. PATENT DOCUMENTS

| | | | |
|---|---|---|---|
| RE34,305 E | | 7/1993 | Sakurai ....................... 370/412 |
| 5,239,539 A | * | 8/1993 | Uchida et al. ............... 370/398 |
| 5,303,236 A | * | 4/1994 | Kunimoto et al. .......... 370/398 |
| 5,359,600 A | * | 10/1994 | Ueda et al. .................. 370/399 |
| 5,557,621 A | | 9/1996 | Nakano ....................... 714/784 |
| 5,577,037 A | * | 11/1996 | Takatori et al. ........... 370/395.7 |
| 5,771,231 A | * | 6/1998 | Watanabe .................... 370/377 |
| 5,818,853 A | | 10/1998 | Nakano ....................... 714/751 |
| 6,012,151 A | * | 1/2000 | Mano ........................... 714/11 |

(Continued)

FOREIGN PATENT DOCUMENTS

| | | |
|---|---|---|
| JP | 21669 | 1/1990 |
| JP | 498937 | 3/1992 |

OTHER PUBLICATIONS

"Basic Knowledge on Data Exchange" Issued by The Telecommunications Association (TTA).
"Easy Digital Switching" Issued by TTA.
"B–ISDN Reader With Pictures" by Ohmsa, Ltd.
"Mastering TCP/IP" Issued by Ohmsha, Ltd.
"Mobile Communication System" issued by Science Newspaper Publishing Company.
"Mobile Communication Handbook"issued by Ohmsha, Ltd.
"Easy Digital Mobile Communication"issued by TTA.
"General Information about CTRON–Introduction and Common Rules" issued TRON Association.

*Primary Examiner*—Brian Nguyen
*Assistant Examiner*—Tri H. Phan
(74) *Attorney, Agent, or Firm*—Mattingly, Stanger, Malur & Brundidge, P.C.

(57) ABSTRACT

A switching system for realizing integration of existing communication networks or interconnections thereof, and a switching control method. After a call is originated from an ATM communication network 101 to an STM communication network 102, an ATMIF 20 that has received a connection request signal (control signal) converts the control signal into a format of an ATM cell 1000, adds a header destined to one of SIG 50-1 to n for processing control signals, and then output the same. An ATMSW 10 performs self-routing based on header information. The selected one of the SIG 50-1 to n performs conversion for the ATM cell 1000 by a specified protocol, makes an ATM cell 1100 having a header destined to one of CLP 630-1 to k for processing control signals, and then output the same. Upon having received the ATM cell 1100, the CLP 630 links up with other processors to perform call connection control, functions having been dispersed among the other processors.

6 Claims, 9 Drawing Sheets

U.S. PATENT DOCUMENTS

| | | | |
|---|---|---|---|
| 6,021,134 A * | 2/2000 | Hiraiwa et al. | 370/474 |
| 6,081,535 A * | 6/2000 | Nam et al. | 370/466 |
| 6,091,736 A * | 7/2000 | Hayashi | 370/428 |
| 6,314,096 B1 * | 11/2001 | Tanabe et al. | 370/389 |
| 6,414,967 B2 * | 7/2002 | Van Grinsven et al. | 370/466 |
| 6,424,662 B1 * | 7/2002 | Miki et al. | 370/535 |
| 6,430,189 B1 * | 8/2002 | Juntumaa et al. | 370/399 |
| 6,529,523 B1 * | 3/2003 | Kato | 370/466 |
| 6,724,774 B1 * | 4/2004 | Sashide | 370/466 |
| 6,731,876 B1 * | 5/2004 | Okamoto et al. | 398/75 |
| 6,741,598 B1 * | 5/2004 | Murakami et al. | 370/395.6 |

* cited by examiner

SWITCHING SYSTEM AND SWITCHING CONTROL METHOD

BACKGROUND OF THE INVENTION

The present invention relates to a configuration of a switching system and a switching control method. More particularly, the invention relates to a switching system, which is suitably used for processing plural kinds of media (voice/image/data) communicated by a variety of media at various speeds, and a control method thereof.

In today's digital communication network, each medium of a voice, an image or data is communicated through a variety of communication networks. For example, these communication networks may include the following: (1) a packet communication network for performing communications by carrying signals on variable length packets, which is described in "Basic Knowledge on Data Exchange" issued by The Telecommunications Association (TTA); (2) a Synchronous Transfer Mode (STM) communication network for performing communications by carrying signals in time slots divided by time in a synchronized frame, which is described in "Easy Digital Switching" also issued by TTA; (3) an Asynchronous Transfer Mode (ATM) communication network for performing communications by carrying signals on fixed-length packets called cells, which is described in "B-ISDN Reader with Pictures" issued by Ohmsha, Ltd.; and (4) an IP communication network (Internet) for performing IP packet communications by carrying signals on variable length packets called IP packets in accordance with a procedure called an Internet Protocol (IP), which is described in "Mastering TCP/IP" also issued by Ohmsha, Ltd. Regarding media for transmitting signals, in addition to a conventional cable medium using such as a metallic cable, an optical fiber or the like, use of media for transmitting signals by radio has rapidly increased as in the case of a mobile communication network, which is described in "Mobile Communication System" issued by Science Newspaper Publishing Company. For such a mobile communication network, various types have been developed: e.g., Personal Digital Cellular (PDC) and Personal Handyphone System (PHS) communication networks for performing communications by carrying signals in time slots as in the case of the STM communication network described in "Mobile Communication Handbook" issued by Ohmsha, Ltd., a Code Division Multiple Access (CDMA) communication network for performing communications by modulating signals with codes different among the signals, which is described in "Easy Digital Mobile Communication" issued by TTA, and so on.

The foregoing existing communication networks and communication systems have been independently developed/introduced. Thus, there are differences in signal formats (speeds, formats) or communication procedures (signal systems, protocols or the like). There are also differences in characteristics among the communication networks. As a result, differences exist in communication services to be rendered, control mechanisms for providing such services (e.g., operation system configurations, hardware/software interface configurations, communication application software functions and configurations) or the like.

Under these circumstances, requests have been made by communication network users that transmit/receive information by using communication networks and providers that provide such communication networks. These requests are as follows: the foregoing differences among the networks should be eliminated (or absorbed), and they can carry out communications with opposite parties by using communication services capable of transmitting information in an optimal state without being conscious of configurations or procedures of the communication networks, whenever they wish and by any devices (stations) they wish to use. If such requests are met, operation convenience of communication facilities will be improved, and communication costs will be reduced. These will contribute to development of the society.

Thus, as described in "General Information about CTRON-Introduction and Common Rules" issued by TRON Association, studies have been made for establishing an integrated communication network, which enables the plural kinds of media (voice/image/data) and communication networks (STM/ATM or cable/radio) to be processed in an integrated manner. Thus far, however, only partial media have been integrated and processed, and the establishment of an integrated communication network has not been completed yet. In addition to the communication network integrating a variety of communication networks, requests have been made to provide a communication network/communication device (mainly a switching system) capable of performing inter-working among the networks, which enables communications to be carried out by absorbing differences among the communication networks and making interconnections with simple control, and also to provide a control method thereof.

Application software developed for each communication network is precious property of communication network's (developer's) own, which has been developed by an enormous amount of time and labor. There is thus a desire to use the application software as it is even if a change occurs in a hardware configuration or a basic software configuration. In other words, continued use of existing application software is desired, even if inter-working is carried out among the plurality of communication networks.

SUMMARY OF THE INVENTION

An object of the present invention is to integrate or interconnect the foregoing existing communication networks. More specifically, it is an object of the invention to provide a switching system, which is suitably used for configuring a communication network to realize integration or interconnections among the existing communication networks, and a control method thereof by a simple configuration and a procedure.

It is an object of the invention to provide a switching system and a control method thereof by a simple configuration and a procedure. In this case, in order to make interconnections and render communication services by connecting existing communication networks to one another so as to make the most of original communication capabilities of the communication networks and provided services, for example while allowing the existing communication networks to exist as they are, the switching system performs necessary signal conversion, switching or control processing and then supplies information from a station of each of the existing communication networks to a desired destination by a desired medium when desired.

It is an object of the invention to provide a switching system and a control method thereof. In this case, in order to realize communication services for performing inter-working with a network of a different kind, such as an STM communication network, an ATM communication network, an Internet network, the switching system needs only to be conscious of a control method as a single interface processor without being conscious of a control method special to the opposite network.

In the case of configuring the foregoing switching system, a size of the switching system becomes large, and traffic congestion occurs as a result of efforts to obtain various services from the plural kinds of networks. Consequently, control signals having various signal formats defined for the existing communication networks are inputted to/outputted from the switching system by specified communication protocols. Therefore, an object of the invention is to provide a switching system for making interconnections among the plural kinds of communication networks by ensuring high-speed processing of the signals, a signal processor, an arranging method and a control method thereof. In this case, the switching system enables its control mechanism to execute high-speed and sure control such as call connection control, communication processing control among the communication networks without deteriorating the capabilities of the existing communication networks.

The kinds and the number of communication networks, to which the switching system is connected, and a content of provided services are changed depending on an environment for installing the switching system, heightened functions of the communication networks or the like. Therefore, an object of the invention is to provide a switching system capable of dealing with various signal processing needs by a simple configuration to be easily expanded or changed, a signal processor, an arranging method and a control method thereof.

It is an object of the invention to provide a procedure for transferring a control signal among various networks, a signal processor for processing a signal in accordance with the procedure and then transmitting the signal to each processor, an interface apparatus for converting various signals transmitted/received among various networks into an integrated format in the switching system, or the like. These are provided in order to realize the switching system suitable for processing multimedia. Also, an object of the invention is to provide a highly universal switching system, a signal switching method and a communication network control method. In this case, the switching system has a configuration to be easily expanded or changed, and is capable of making interconnections among various communication networks by using the above apparatuses in combination.

It is an object of the invention to easily provide a highly universal and flexible switching system. In this case, the switching system makes interconnections among plural kinds of communication networks by easily executing addition/changing of each block such as a signal processor, addition of a new communication network interface or the like.

An object of the invention is to enable control processing of the switching system to progress for each function block. In this case, each function block such as a signal process needs only to add, to a header of an ATM cell, destination information regarding a function block, to which a signal should be transmitted, convert it into a cell and then transmit the same. An ATM switch performs self-routing for the ATM cell based on the header information and transfers the same among destination function blocks.

It is an object of the invention to easily provide a switching system, which is suitable for making high-speed and sure interconnections among various communication networks by using an ATM switch to transfer an ATM cell without any concentration of control signals in one processor (function block), without any bottlenecks in the communication path of the control signals, and without any congestion or cell losses.

In order to achieve the foregoing objects, the switching system of the invention comprises an ATM switch as a switch for interconnecting networks and switching signals, and various communication network interfaces. The ATM switch asynchronously switches fixed-length packets (cells). Each of the interfaces connects each communication network to the switch and performs conversion/reverse conversion for a signal from the communication network, and also converts/reversely converts a control signal from each communication network or a control procedure into a signal or a procedure for the inside of the switching system.

In a conventional integrated type switching system, there have been limitations on communication networks to be interconnected or kinds of signals to be processed. On the other hand, the switching system of the invention includes a function of interfacing with each communication network and converting a signal transmitted/received among the communication networks into an ATM cell, and a function of terminating a procedure for transmitting/receiving a control signal necessary for information transfer among the communication networks and a signal. Information transfer is carried out among the communication networks based on the control signal transmitted/received among the networks and, by using the ATM switch to switch the information transferred among the communication networks, interconnections can be made among the plurality of different communication networks.

In order to process the foregoing control signals of various communication networks and make interconnections, the switching system of the invention is configured in a manner that a control processor is provided as a multiprocessor, which is composed of a plurality of processors, functions and loads for control are dispersed among the processors, and thus high-speed and sure control can be realized.

In accordance with the invention, regarding a signal processor for absorbing differences in signal formats or processing procedures among the communication networks by integrating the blocks in an interface converted into an ATM cell and connecting these by using the ATM switch to transfer a cell, the number of signal processors to be provided is equal to the number (kinds) of such differences, and the control processor performs control for the switching system dealing with a request while selecting one of the signal processors in response to the request from one of the communication networks. According to the invention, each function block such as the signal processor converts a signal to be transmitted into an ATM cell and then transfers the same.

ATM switch can allocate all the resources to be used for ATM cell transfer (switching) among the function blocks except while communications are carried out temporarily by an in-channel of control signals. The ATM switch performs ATM cell transfer (self-routing) among the function blocks while preventing cell clashing. Accordingly, by providing a path between the function blocks for the ATM switch and using this path to select a function block for executing control to be performed in the switching system and then transferring information, each function block can pursue its own processing.

In accordance with first solving means of the present invention, a switching system is provided for transferring information by making interconnections among plural kinds of communication networks, comprising:

plural kinds of interfaces for converting signals from the plural kinds of communication networks into asynchronous transfer mode cells (ATM cells);

an ATM switch having a plurality of input and output lines for transferring an ATM cell received from one of the interfaces by any one of the input lines to any one of the plurality of output lines based on header information of the ATM cell; and plural kinds of signal processors for converting control signals outputted from the interfaces into signal formats or protocols respectively used by the plural kinds of communication networks.

In accordance with second solving means of the invention, a switching control method is provided for transferring information by making interconnections among plural kinds of communication networks, comprising the steps of:

when call origination is made from a first communication network to a different second communication network, causing one of interfaces receiving a control signal to convert the control signal into a format of a first ATM cell having added header information destined to one of signal processors for performing signal processing, and output the same;

causing an ATM switch to transfer the first ATM cell to specified and selected one of the signal processors based on the header information;

causing the selected one of the signal processors to perform conversion for the received first ATM cell by a specified signal format or protocol, form a second ATM cell having added header information destined to one of the interfaces connected to a first control processor for processing a control signal or the second communication network, and then output the same; and causing the ATM switch to transfer the second ATM cell to any one of the interfaces connected to the selected one of the first control processor and the second communication network.

DETAILED DESCRIPTION OF THE PREFERRED EMBODIMENTS

Next, description will be made of a switching system of the present invention, a configuration of a communication network employing this switching system, a switching control method and a mode of carrying out communication network control with reference to the accompanying drawings.

The embodiments of the invention described hereinbelow are only examples, and the switching system of the invention, the communication network employing the same and the switching control method can be applied to interconnections with communication networks of other kinds, such as a connection between an ATM communication network and an IP communication network, between an STM communication network and the IP communication network or the like.

Figure 1:
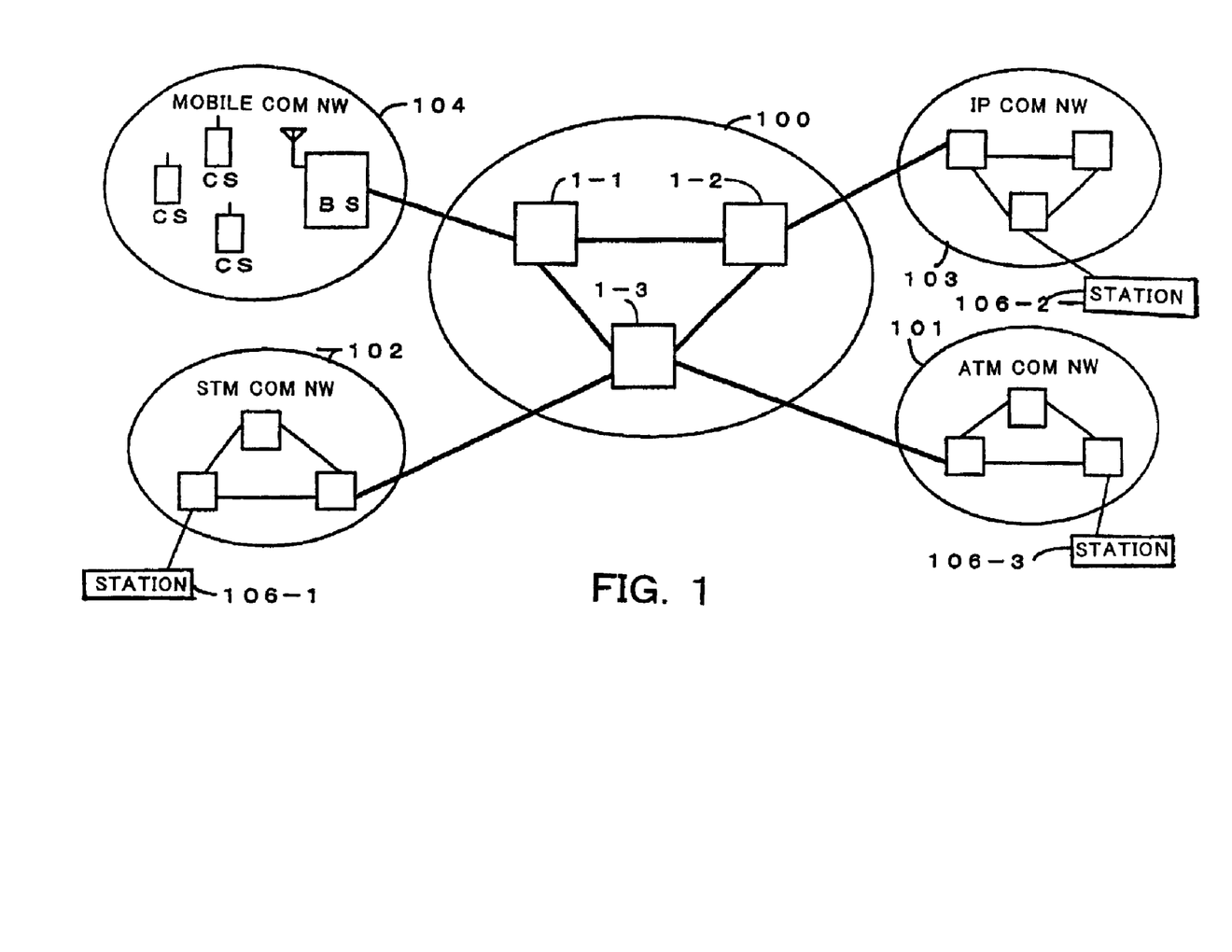
FIG. 1 is a network configuration view showing a configuration example of a communication network employing a switching system of the present invention.

FIG. 1 is a network configuration view showing a configuration example of a communication network employing a switching system of the present invention. This communication network is configured in a manner that some networks are connected to a multimedia communication network 100 equipped with a switching system 1 of the invention. The connected networks include an ATM communication network (e.g., a cell relay network) 101 for transmitting/receiving information by an ATM cell, an STM communication network (e.g., a digital switching network or an INS 64 communication network provided by NTT) 102 for transmitting/receiving information by a time-division multiplex time slot, an IP communication network (e.g., OCN provided by NTT) 103 for transmitting/receiving information by an IP packet, a mobile communication network 104 such as PDC, PHS or the like, and so on. The switching system 1 of the invention connects different communication networks with each other. This connection is carried out by converting a signal containing information communicated between user stations 106 accommodated in the respective communication networks (or between communication stations CS of the mobile communication network 104), alternatively by analyzing/converting a control signal for a connection request or the like. Note that switching systems 1-1 to 3 can be connected to proper communication networks of various kinds.

Figure 2:
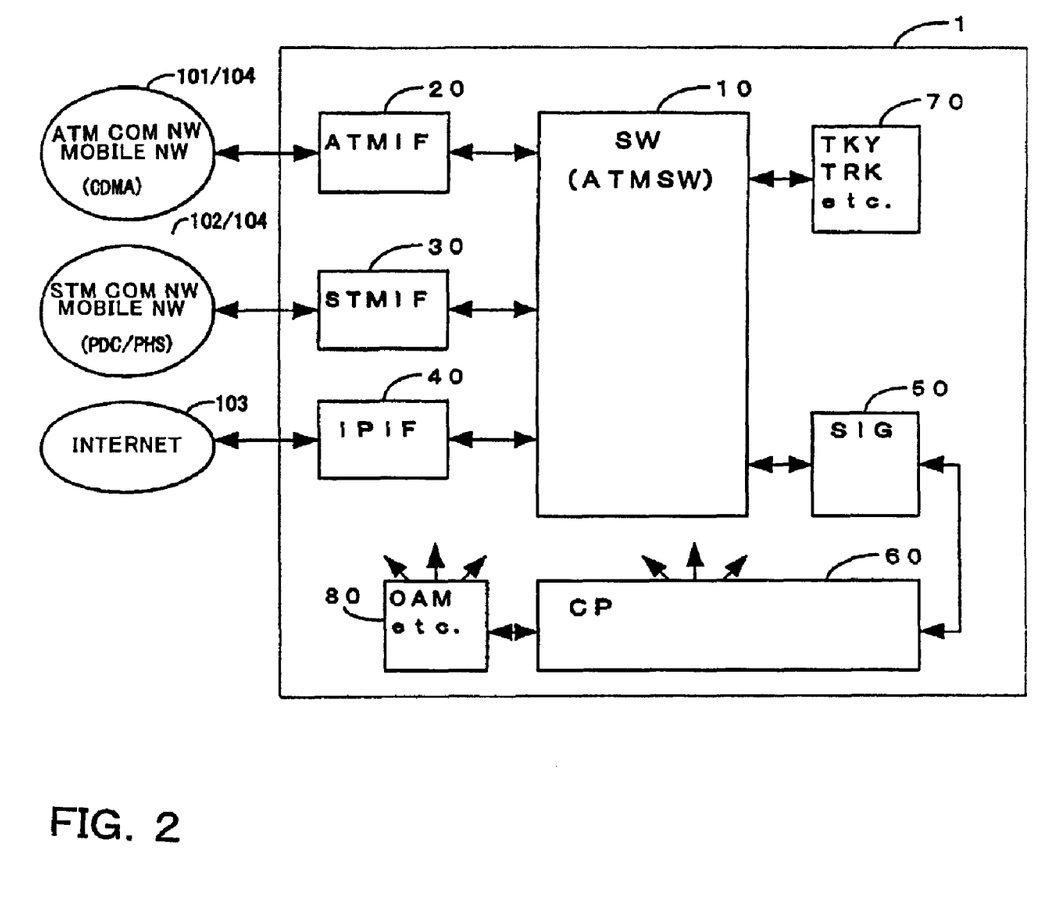
FIG. 2 is a block configuration diagram showing in outline a configuration of the switching system of the invention.

FIG. 2 is a block configuration diagram showing in outline a configuration of the switching system of the invention.

The switching system 1 comprises an ATM switch (ATMSW) 10, an ATM interface (ATMIF) 20, an STM interface (STMIF) 30, an IP interface (IPIF) 40, a signal processor (SIG) 50, a control processor (CP) 60, a trunk unit 70, and an operation and administration device (OAM) 80.

The ATMSW 10 is an ATM switch for performing switching by using a signal, which is obtained by entering in an information part of an ATM cell, various bits of information (voice, image, data or the like) converted into an ATM cell and transmitted/received between users, or control information transmitted/received between the processor of the control processor 60 and each apparatus (a communication network or a communication network interface apparatus). The ATMIF 20 has an interface function with the ATM communication network. The STMIF 30 has an interface function with the STM communication network. The IPIF 40 has an interface function with the Internet. The SIG 50 has a function for transmitting/receiving a control signal between the communication networks. The control processor 60 controls the entire switching system, processes a call control signal transferred between the communication networks and performs switching control. The trunk unit 70 includes a responder such as a talkie, or a function necessary for rendering various services. The operation and administration device 80 is a block for performing monitoring/maintenance/administration for the switching system, clock supplying or the like.

The switching system of the invention functions to make connections with various communication networks, and as the ATMSW 10, a switch having a large capacity and causing no cell losses should preferably be used. Accordingly, by using a common buffer type ATM switch (e.g., see Patent Laid-Open Hei 2 (1990)-1669), or a cell divided type ATM switch (e.g., see Patent Laid-Open Hei 4 (1992)-98917), an economical and highly reliable switching system can be realized. In this specification, the signal obtained by entering control information or the like in the information part of the ATM cell may be simply referred to as in-channel.

For example, when call origination is made from a station 106-3 of the ATM communication network 101 to a station 106-1 of the STM communication network 102, a signal for controlling a connection is entered from the AMTIF 20 through the ATMSW 10 and the SIG 50 to the control processor 60. The control processor unit 60 performs call connection control to verify an idle state of the station 106-1 of the STM communication network 102, and the ATMIF 10 and the STMIF 30 are set and controlled by the in-channel. Thereafter, the control processor 60 operates such that inter-station information can be switched or converted and then transmitted/received between the ATMIF 20 and the STMIF 30 through the ATMSW 10. If the station 106-3 makes a request for connection to the Internet 103, then a similar operation is performed by selecting the IPIF 40 instead of the STMIF 30. Also, a necessary talkie or trunk can be selected from the trunk unit 70 during communication control, and connected to each communication network interface.

Figure 3:
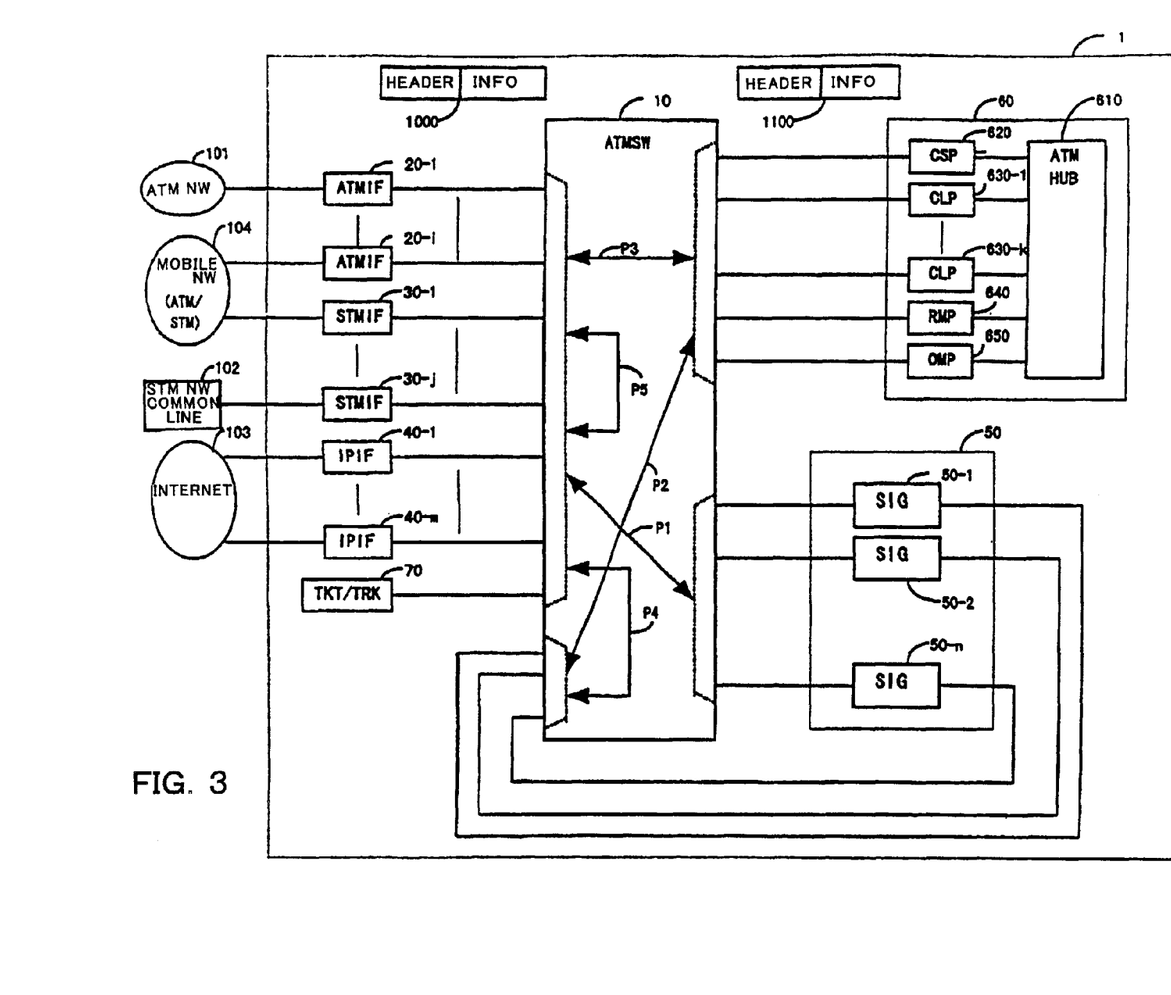
FIG. 3 is a block configuration diagram showing in detail the configuration of the switching system of the invention.

FIG. 3 is a block configuration diagram showing in detail a configuration of the switching system of the invention. In the drawing, especially configuration of the SIG 50 constituting the switching system, disposition thereof in the switching system or the like is shown in detail. Dotted lines in the ATMSW 10 indicate, for instance incorporation of a representative connection.

The switching system of the invention is configured in a manner that the constituting elements are respectively connected to the ATMSW 10 as shown in the drawing. Specifically, these elements include the following: pluralities of interfaces, i.e., ATMIF 20-1 to i, STMIF 30-1 to j, and IPIF 40-1 to m, these interfaces being connected to plural kinds of communication networks, i.e., the ATM communication network 101, the STM communication network 102, the mobile communication network 104, and the IP communication network (Internet) 103; the trunk unit 70; SIG 50-1 to n; and the control processor 60 composed of a plurality of processors for controlling the switching system.

The SIG 50-1 to n process control signals inputted/outputted from the plural kinds of communication networks through the interfaces. Specifically, the SIG 50-1 to n perform communication processing such as signal formatting, protocol conversion or the like for the control signals. A plurality or plural kinds thereof are accommodated in the ATMSW 10. For example, the SIG 50-1 to n absorb/convert differences among signal formats or communication protocols of signals transmitted/received with various communication networks (communication processing), and then transmit/receive the signals having been subjected to the communication processing with the control processor 60. Alternatively, the SIG 50-1 to n transmit/receive the communication-processed signals with the respective interfaces of other communication networks. In other words, the SIG 50-1 to n convert/absorb differences among control signals for conversion thereof into an integrated signal of the control processor, or convert information among the communication network interfaces for transfer of information among different communication networks. Even if control signals having various forms/procedures are inputted/outputted from the communication networks, by performing such a conversion operation, the SIG 50-1 to n can actuate software, which causes the control processor 60 to analyze/process the control signals and provide communication services such as call processing or the like requested by a user. The SIG 50-1 to n can be load-dispersing types as occasion demands.

The control processor 60 includes: a resource management processor (RMP) 640 having a function of performing resource management for the entire switching system 1; an operation and management processor (OMP) 650 having a function of performing operation and management for the switching system and an interface function of performing communications with a remote operation and management center; a common signaling processor (CSP) 620 having a function of processing a common signal, which is defined in Recommendation by International Telecommunication Union (ITU-T), and an interface function with a common signal network; and a calling processor (CLP) 630 for terminating the call connection signals from the respective communication networks to provide a switching control function for multimedia calling. The control processor 60 performs control for the entire switching system 1 by dispersing functions among the processors. More specifically, the control processor 60 is provided with an ATMHUB 610 as a dedicated ATM switch for transferring a message transmitted/received among the processors, interconnects the processors and then controls the switching system 1. Note that CLP 630-1 to k can be composed of a plurality of processors in accordance with a capacity (load) of the switching system, and loads can be dispersed among the plurality of CLP 630-1 to k. A switch used for the ATMHUB 610 interconnects the processors, and needs not have a capacity as large as that of the ATMSW 10. Accordingly, a switch similar but smaller in capacity than the ATMSW 10 may be used. Also, the ATMSW 10 directly connects all the processors by lines, and converts a message based on an address of a cell header. For more details on the control processor 60, see Patent Application Hei 11 (1999)-47595.

When there is a change in data or the like regarding applications or communication networks, or for initial setting, the control processor 60 can download a program or data for each block. For example, after a proper processor such as the RMP 640 receives a program or data by an input from an operator or transfer through a common line or the like, the program or the data can be downloaded from the RMP 640 to each interface, the SIG 50 or the like as occasion demands.

Signals from the above function blocks (each communication network interface, the SIG and each processor) are all converted into ATM cells 1000 and 1100 except messages transferred among the plurality of processors for control, and then transferred among the blocks by using logical paths P1 to P5 set in the ATMSW 10. Specifically, as described in Patent Laid-Open Sho 63 (1988)-72293, after each function block adds destination information to the header of the ATM cell, the ATMSW 10 performs self-routing for the ATM cell to the function block as an information destination through a logical path based on the header information. Regarding the addition of destination information for each function block, as described in Patent Laid-Open Hei 3 (1991)-218142, each function block is provided with a table having prestored destination information and, when a signal to be transmitted is entered, destination information is added to a header by referring to the table. Note that, a content of the table is set from the operation and administration device 80 or a proper administration device (not shown) in the system at the time of installing the switching system or changing the configuration.

In the switching system of the invention, the plurality of SIG 50-1 to n are connected to the ATMSW 10, and functions are provided for executing communication processing different among the SIG 50-1 to n. When a request of communication services (e.g., connection with another communication network) is made from a given communication network, conversion of a control signal is carried out by selecting one necessary (optimal) for signal processing from the plurality of SIG 50-1 to n, and a processor is selected to process the converted control signal, which is necessary for providing communication services. Then, communication services such as interconnections between the communication networks of different kinds are executed. Note that a plurality of SIG 50-1 to n may be provided for executing communication processing in accordance with a size of the switching system.

In taking an example of communications between the ATM communication network 101 and the STM communication network 102, the switching system operates as follows. Detailed description will be made later with reference to FIGS. 5 to 9.

(1) Call origination is made from the ATM communication network 101 to the STM communication network 102. Then, the ATMIF 20 that has received a connection request signal (control signal) converts the control signal into a format of an ATM cell 1000, adds a header destined to one of the SIG 50-1 to n for processing the control signal, and then outputs the same. Specifically, the ATMIF 20 adds destination information destined to proper one of the SIG 50-1 to n to a header by referring to an internal or external table (not shown), and outputs the same to the ATMSW 10. Then, the ATMSW 10 transfers the cell 1000 through a path P1 to a specified and selected one of the SIG 50-1 to n based on the header information (self-routing).

(2) The selected SIG performs conversion for the ATM cell 1000 by a specified protocol, adds a header destined to a processor (in this example, any one of the CLP 630-1 to k because of a connection request) for processing the control signal, and then outputs the same as an ATM cell 1100. This ATM cell 1100 is transferred to any selected one of the CLP 630-1 to k through the path P2 of the ATMSW 10 as in the case of (1). Note that selection of any one of the plurality of CLP 630-1 to k is executed based on instruction from the RMP 640.

(3) Upon having received the ATM cell 1100, the CLP 630 performs call connection control by linking with the other processors, to which the functions have been dispersed. Specifically, the CLP 630 returns a response signal through a path and a procedure opposite to those described above. If connection is allowed with the STM communication network 102, then the ATMIF 20 and the STMIF 30 are set and controlled by the in-channel (in this example, setting is executed through a path P3).

(4) Thereafter, switching and conversion are performed for the ATM cell 1000 by the ATMSW 10, and information between the stations can be transmitted/received between the ATMIF 20 and the STMIF 30 through a path P5.

As described above, in accordance with the present invention, the blocks are interconnected by transferring the ATM cell through the integrated interface by the ATMSW 10, and regarding the SIG 50-1 to n for absorbing differences in signal formats or processing procedures among the communication networks, the number thereof equal to the number (kinds) of such differences are provided. Then, the control processor performs control for the switching system dealing with a request while selecting proper one of the SIG 50-1 to n in response to the request from the communication network. Accordingly, the invention can facilitate addition/changing of blocks, addition of new communication network interfaces or the like, and can easily provide a highly universal and flexible switching system for interconnecting plural kinds of communication networks.

Also, in accordance with the invention, the switching system is configured in a manner that each block converts a signal to be transmitted into an ATM cell and then transfers the same. Accordingly, with the invention, it is only necessary for each function block to add destination information of a function block, to which the signal should be transmitted, to a header of the ATM cell, and then transfer the cell. Then, the ATMSW 10 performs self-routing for the ATM cell based on the header information, and transfers the cell between the destination function blocks. In this way, control processing of the switching system can progress for each function block.

The ATMSW 10 can allocate all the resources for ATM cell transfer (switching) among the function blocks except, for instance when communications of the control signal by the in-channel are temporarily executed through the path P3. The ATMSW 10 performs ATM cell transfer among the function blocks (self-routing) while preventing cell clashing. Accordingly, the ATMSW 10 is provided with paths among the function blocks, information is transferred by selecting a function block for executing control to be processed in the switching system by using one of the paths, and then each block can perform its own processing. Thus, with the invention, ATM cell transfer performed by the ATMSW 10 can prevent control signals from being concentrated in one apparatus (function block), and can also prevent the control signal from becoming bottlenecks in a communication path. Furthermore, since congestion or cell losses are difficult to occur, a switching system can easily be provided, which is suitably used for ensuring high-speed interconnections among a variety of communication networks.

Figure 4:
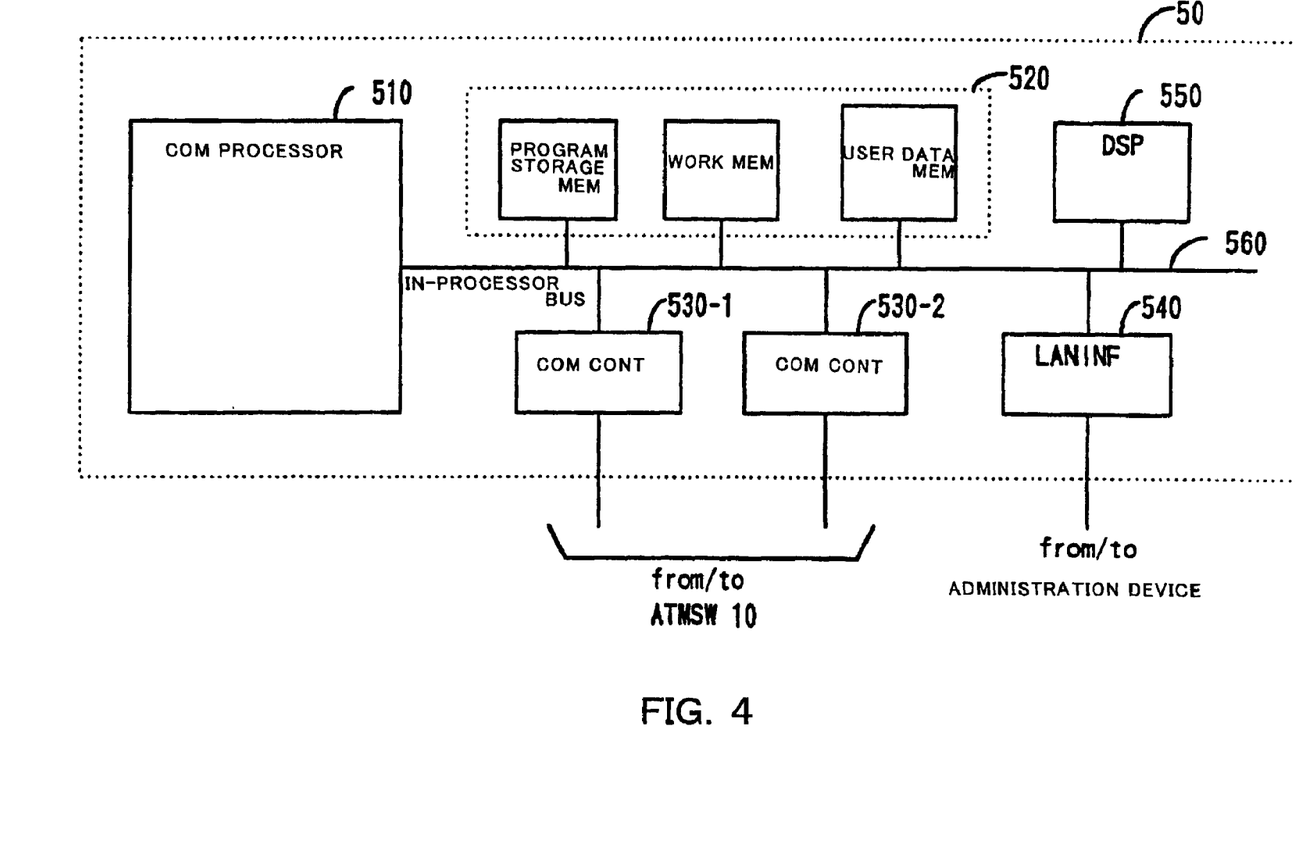
FIG. 4 is a block configuration diagram showing a signal processor of the invention.

FIG. 4 is a block configuration diagram showing an example of a signal processor of the present invention.

As shown in the drawing, the SIG 50 used for the switching system of the invention includes a communication control processor 530 for transmitting/receiving a control signal converted in an ATM cell with the ATMSW 10, a communication processor 510 for absorbing/converting differences in signal formats or communication protocols of control signals from a variety of communication networks, a memory 520 used for storing programs of communication processor operations or operating the communication processor 510, and so on. These elements are interconnected through an in-processor bus 560. Note that a DSP 550 is a digital signal processor, which shares functions with the communication processor 510 to execute encryption, compressing/expanding of information or the like in the process of processing the control signal, when such a special operation is necessary. Also, a LANIF 540 is an interface with a not-shown operation management processor of the switching system, and mainly used for operation management of the signal processor.

The memory 520 includes a program storage memory, a work memory, a user data memory, and so on. A table for header conversion of an ATM cell can be provided in, for instance the user data memory, or the other memory of the memory 520 as occasion demands. Upon having received a control signal converted into an ATM cell from each communication interface or the control processor, for example, the communication control processor 530 analyzes a content of an ATM cell header, transmits the control signal inserted into a payload part to the communication processor 510. The communication control processor 530 inserts the control signal processed by the communication processor 510 into the payload of the ATM cell, adds destination information to the header and then transmits the same to the ATMSW 10.

In accordance with the invention, since the SIG 50 is configured in the foregoing manner and connected to the ATMSW 10, the ATMSW 10 performs self-routing for the cell including the control signal based on the header information of the ATM cell, and high-speed transfer of the control signal can be ensured between the communication interface and the control processor. Moreover, the SIG 50 absorbs/converts differences in signal formats or communication protocols of control signals from the communication networks (communication processing). Accordingly, interconnections can be easily made among the communication networks of different kinds only by connecting a plurality of SIG 50 for executing different communication processing operations to a plurality of ATMSW 10, setting a header of an ATM cell such that each communication interface or processor can select a necessary SIG 50, and then transmitting/receiving control information by the ATM cell. Conversely, only by setting a header of an ATM cell such that the SIG 50 can select a necessary communication interface or processor, and then transmitting/receiving control information by the ATM cell, similarly, interconnections can be easily made among communication networks of different kinds. In addition, according to the invention, a highly universal and expansive switching system can be realized.

Next, to further clarify the features of the switching system of the invention, description will be made of the configuration and operation of the system with reference to the drawings.

Figure 5:
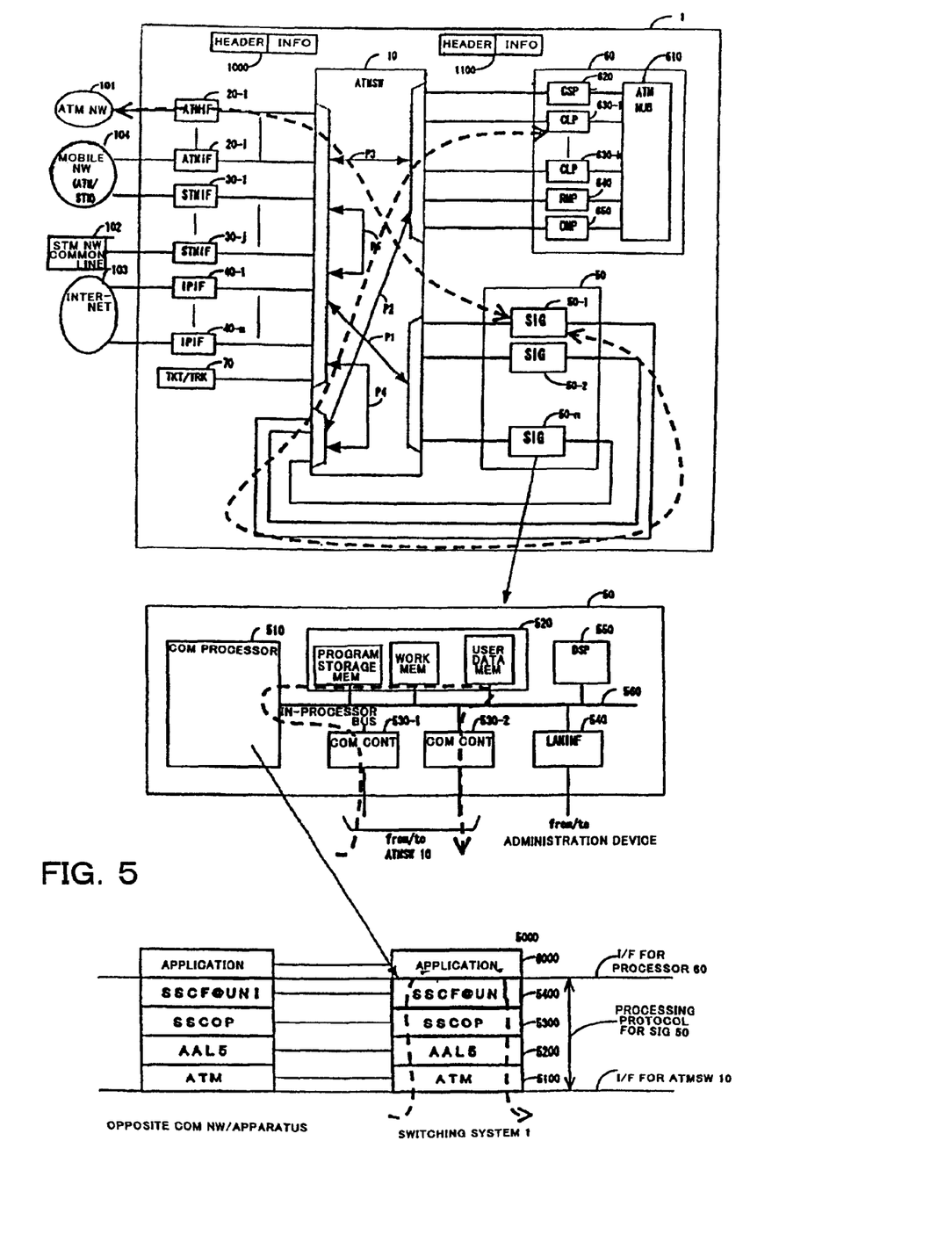
FIG. 5 is a view illustrating an operation of the switching system of the invention regarding call connection control (when a call is originated from a network).

FIG. 5 is a view illustrating an operation of the switching system of the invention regarding call connection control (when a call is originated from a network). The drawing shows an example of a call connection control operation performed by the switching system when a call is originated from the ATM communication network 101 to the other communication network (the STM communication network 102).

(1) First, the ATM communication network 101 transmits a control signal requesting call origination to the STM communication network 102, e.g., a signaling ATM cell storing a SETUP message. Upon having received the control signal, an ATMIF 20-1 rewrites a header of the ATM cell to a header destined to the SIG 50 (in this example, a SIG 50-1) having a function of communication-processing for the control signal, and then outputs an ATM cell 1000 obtained by the rewriting to the ATMSW 10.

(2) The ATMSW 10 transfers the entered ATM cell 1000 to the SIG 50-1 through a path P1 based on header information.

(3) In the SIG 50-1, after a communication control processor 530-1 has received the ATM cell 1000, the communication processor 510 performs conversion for the control signal in accordance with a procedure of a protocol stack 5000. Specifically, for example, each signal processing of ATM 5100, AAL 5 5200, SSCOP 5300, and SSCF@UNI 5400 defined in ITU-T Recommendation is executed for the ATM cell 1000, and then the ATM cell 1000 is converted into a SETUP message. Then, the SIG 50-1 makes an ATM cell 1100 having a header added to the converted signal and destined to a proper control processor 60 (in this example, a CLP 630-1), and outputs the same from a communication control processor 530-2.

(4) The ATMSW 10 transfers the entered ATM cell 1100 to the CLP 630-1 through the path P2 based on the header information.

(5) The CLP 630-1 takes out the SETUP message from the entered ATM cell 1100, performs call processing by linking with each processor, makes a PROC message as a response to the SETUP, converts the message into an ATM cell 1100 having a header destined to the SIG 50-1, and then outputs the same to the ATMSW 10. Note that, for call connection control based on a linked operation among a plurality of processors, for instance control described in Patent Application Hei 11 (1999)-47595 or the like can be used.

(6) The ATMSW 10 transfers the entered ATM cell 1100 to the SIG 50-1 through the path P2 based on the header information.

(7) In the SIG 50-1, upon having received the ATM cell 1100, the communication processor 510 executes each signal processing of the SSCF@UNI 5400, the SSCOP 5300, the AAL 5 5200, the ATM 5100 for the PROC message taken out from the ATM cell 1100 in accordance with a procedure opposite to that of (3). Then, the processor 510 adds a header destined to the ATMIF 20-1, makes an ATM cell 1000 storing the PROC message, and outputs the same to the ATMSW 10.

(8) The ATMSW 10 transfers the entered ATM cell 1000 to the ATMIF 20-1 through the path P1 based on the header information.

(9) Upon having received the ATM cell 1000 storing the PROC message as a response signal, the ATMIF 20-1 converts the ATM cell 1000 into a signaling ATM cell rewritten to a header destined to the ATM communication network, and then outputs the same to the ATM communication network 101.

Figure 6:
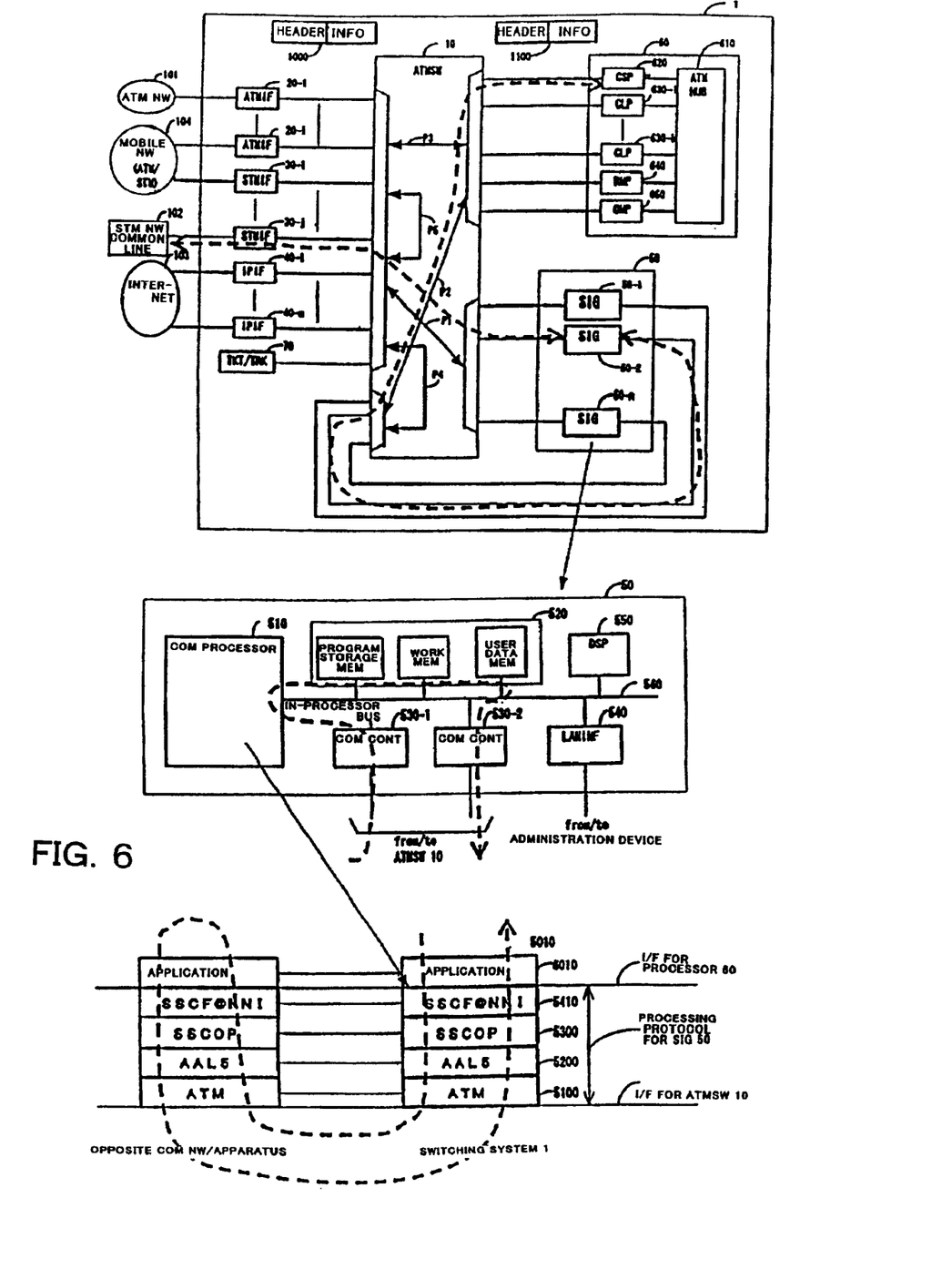
FIG. 6 is a view illustrating an operation of the switching system of the invention regarding call processing control (when a common signal is used).

FIG. 6 is a view illustrating an operation of the switching system of the invention regarding call processing control (when a common signal is used). The drawing shows an example of a call processing operation performed by the switching system using a common signal defined in ITU-T Recommendation. Now, by referring to FIG. 1, specific description will be made of a case where when a call is originated from the ATM communication network 101 to the mobile communication network 104, the switching system 1-1 in the communication network 100 processes a connection request transmitted thereto through a common line in the call processing process of the switching system 1-3.

(1) In call processing control described in Patent Application Hei 11 (1999)-47595, for example, the CLP 630-1 of the switching system 1-3, to which the ATM communication network 101 has been connected, receives a control signal, e.g., a SETUP message, and then sends a IAM message to the connection target side switching system 1-1, to which the mobile communication network 104 has been connected, by using a common signal system defined in ITU-T Recommendation. In this case, in the switching system 1-3 shown in FIG. 6, the CSP 620 makes an ATM cell 1100 having a header added to the IAM message and destined to the SIG 50 (in this example, the SIG 50-2) provided with a function of processing a common signal, and then outputs the same to the ATMSW 10. Note that, since the ATMSW 10 performs ATM cell transfer based on a header like that described above, an operation thereof will be omitted hereinafter.

(2) In the SIG 50-2, after the communication control processor 530-1 has received the ATM cell 1100, the communication processor 510 performs conversion for the control signal in accordance with a procedure of a protocol stack 5010. Specifically, the communication processor 510 executes each signal processing of the SSCF@NNI 5410, the SSCOP 5300, the AAL 5 5200, and the ATM 5100 for the IAM message taken out from the ATM cell 1100, and converts the cell into an ATM cell 1000 storing the IAM message. Note that a destination of this cell is a common network to the connection target side switching system 1-1. Accordingly, for example a header destined to an STMIF 30-j connected to the STM communication network (common network) 102 is added to the cell, and then this cell is outputted from the communication control processor 530-2 to the ATMSW 10.

(3) The STMIF 30-j converts the IAM message into a signal format defined in the common network 102 based on the ATM cell 1000 received from the ATMSW 10, and then outputs the same.

(4) Since an ACM message as a response signal of the IAM message is returned from the common network 102, the STMIF 30-j converts this message into an ATM cell 1000, and then outputs the same to the ATMSW 10. Note that, as a destination of the cell is the SIG 50-2, a proper header is added and then the cell is outputted to the ATMSW 10.

(5) In the SIG 50-2, after the ATM cell 1000 has been received, the communication processor 510 executes each signal processing of the ATM 5100, the AAL 5 5200, the SSCOP 5300, and the SSCF@NNI 5410 for the ATM cell 1000 in accordance with a procedure opposite to that of (3), converts the cell into an ACM message. Then, the communication processor 510 makes an ATM cell 1100 having a header added to the converted signal and destined to the CSP 620, and outputs the same to the ATMSW 10.

(6) The CSP 620 takes out the ACM message from the ATM cell 1100, and continues call processing by linking with each processor. The PROC message in the operation example described above with reference to FIG. 5 is made based on a result of this operation.

Execution of call processing like that described above with reference to FIGS. 5 and 6 enables the path P4 or P5 to be set for transfer of user information in the switching system, and also enables a path to be set between the switching systems of the communication network 100.

Figure 7:
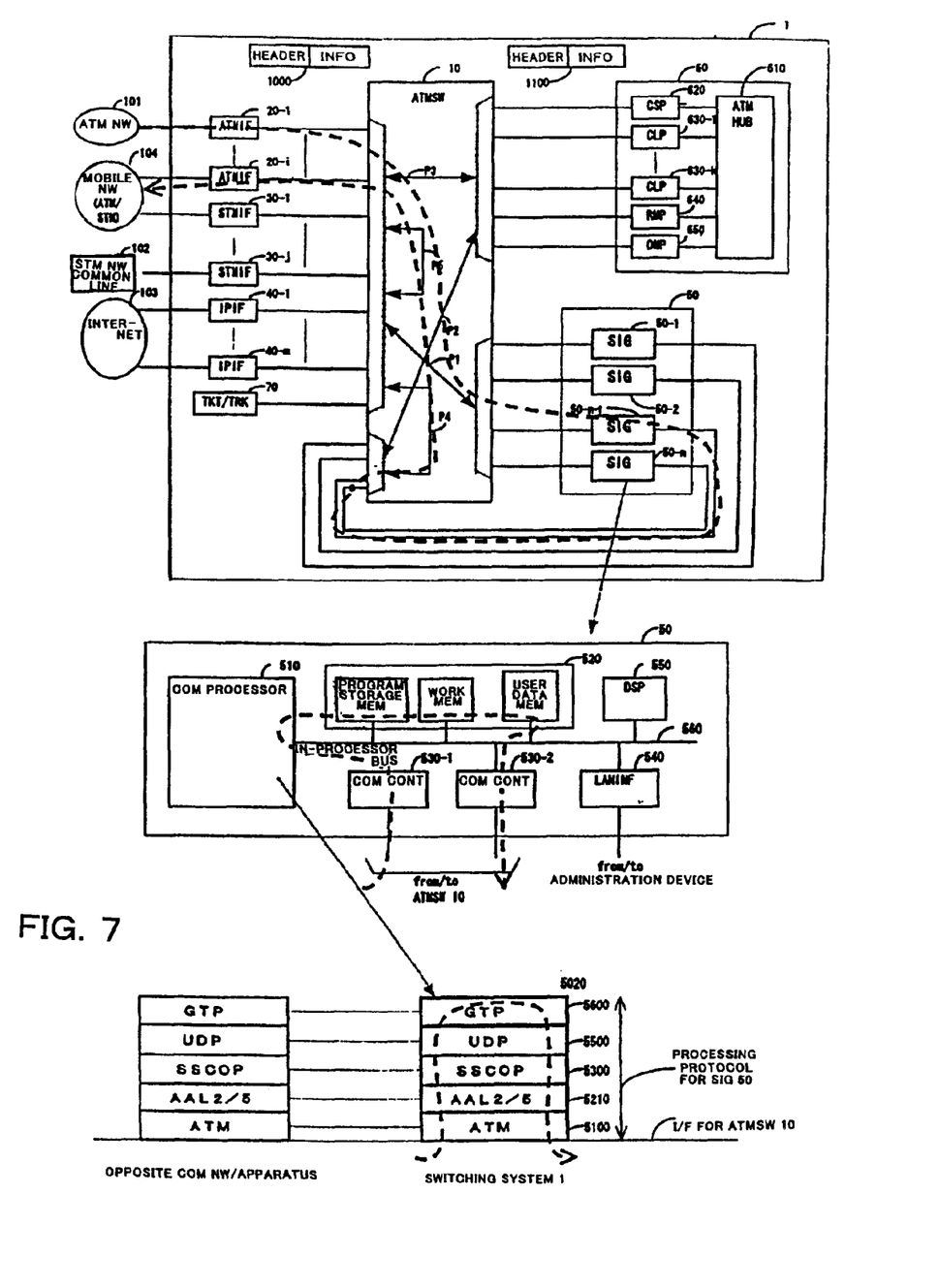
FIG. 7 is a view illustrating a relaying operation of the switching system of the invention.

FIG. 7 is a view illustrating a relaying operation of the switching system of the invention.

This operation example refers to a case where the IP packet from the IP communication network 103 is relayed around among the switching systems 1-1 to 3 of the multimedia communication network 100 in FIG. 1. Specifically, the example shows a relaying operation performed by the switching system 1-3 when the IP communication network 103 transmits/receives the IP packet with the mobile communication network 104 from the switching system 1-2 through the switching system 1-3, and then through the switching system 1-1. Note that at the time starting the operation, in call connection control like that described above with reference to FIGS. 5 and 6, for each switching system, a path is set for transferring a signal obtained by converting the IP packet into an ATM cell to the ATMSW 10.

(1) In the switching system 1-3, upon having received the IP packet converted into an ATM cell from the ATM communication network 101, the ATMIF 20-1 makes an ATM cell 1000 by rewriting a header of the ATM cell to a header destined to the SIG 50 (in this example, a SIG 50-($n$–1)) provided with a function of executing IP packet relaying, and then outputs the same to the ATMSW 10. The ATM cell 1000 is transferred through the path P1 previously set by the ATMSW 10 during call processing.

(2) In the SIG 50-($n$–1), after the communication control processor 530-1 has received the ATM cell 1000, the communication processor 510 performs conversion and processing for the signal in accordance with a procedure of a protocol stack 5020. Specifically, the ATM cell 1000 is subjected to each signal processing of Global System for Mobile Communications (GSM) of European Telecommunication Standard Institute (ETSI), the ATM 5100, the AAL 2/5 5210, the SSCOP 5300, the UDP 5500 and the GTP 5600 defined in ITU-T Recommendation, and the information of the IP packet is reproduced. Then, Quality of Service (QoS) checking or the like is performed for the IP packet and, if there are no abnormalities, or if there are no problems in the IP packet, the signal is converted again into an ATM cell in accordance with an opposite procedure. Then, an ATM cell 1000 having a header is made, the header being destined to an ATMIF 20-$i$ connected to the mobile communication network 104 (or the ATM communication network connected thereto), which is a destination of IP packet transmission. This ATM cell 1000 is then outputted from the communication control processor 530-2. The ATM cell 1000 is transferred through the path P4 previously set during call processing.

(3) Upon having received the ATM cell 1000, the ATMIF 20-$i$ converts the cell into an ATM cell having a rewritten header destined to the mobile communication network 104 (or the ATM communication network connected thereto), and then outputs the IP packet converted into the ATM cell to the mobile communication network 104 (or the ATM communication network connected thereto).

Figure 8:
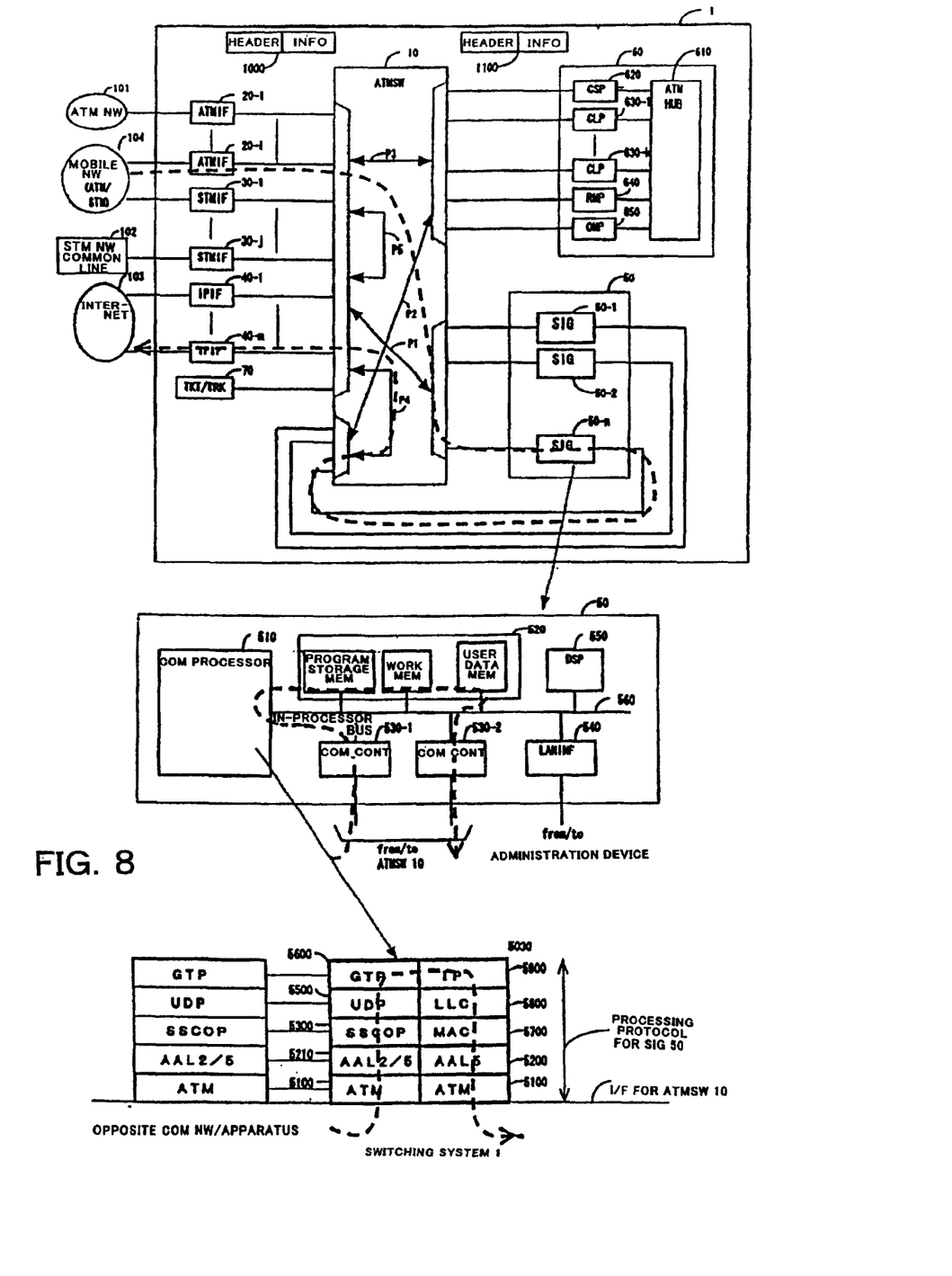
FIG. 8 is a view illustrating an operation of the switching system of the invention regarding connection to an IP communication network.

FIG. 8 is a view illustrating an operation of the switching system of the invention regarding connection to the IP communication network.

This operation example also concerns IP packet processing, and shows an operation when the switching system 1-2 outputs an IP packet to the Internet 103, the IP packet having been relayed in the multimedia communication network 100 like that described above with reference to FIG. 7. Note that, as in the case described above with reference to FIG. 7, the logical path of each switching system has already been set.

(1) First, the ATMIF 20-$i$ receives an IP packet converted into an ATM cell from the mobile communication network (or the ATM communication network) 104. Then, the ATMIF 20-$i$ makes an ATM cell 1000 by rewriting a header of the ATM cell to one destined to the SIG 50 (in this example, the SIG 50-$n$) provided with a function of executing reproducing of the IP packet, and then outputs the same to the ATMSW 10. The ATM cell 1000 is transferred through the path P1 previously set during call processing.

(2) In the SIG 50-$n$, after the communication control processor 530-1 has received the ATM cell 1000, the communication processor 510 performs conversion and processing for the signal in accordance with a procedure of a protocol stack 5030. Specifically, the ATM cell 1000 is subjected to each signal processing of the GMS of the ETSI, and the ATM 5100, the AAL 2/5 5210, the SSCOP 5300, the UDP 5500 and the GTP 5600 defined in ITU-T Recommendation, and the information of the IP packet is reproduced. Then, if there are no problems in the IP packet, each signal processing of IP 5900, LLC 5800, MAC 5700, the AAL 2/5 5210 and the ATM 5100 as procedures defined for IP. Also, an ATM cell 1000 having the IP packet converted into the ATM cell to be outputted to the Internet 103 is made. Note that a header destined to an IPIF 40-*m* connected to the Internet 103 is added to this ATM cell 1000, and then the cell is outputted to the ATMSW 10. The ATM cell 1000 is transferred through the path P4 previously set during call processing.

(3) Upon having the ATM cell 1000, the IPIF 40-*l* deletes the header, converts the cell into an interface for an Ethernet, and then outputs the IP packet to the Internet 103.

Note that the IP packet processing operations described above with reference to FIGS. 7 and 8 are performed after the path setting is finished for each switching system during call processing like those described above with reference to FIGS. 5 and 6. Thus, as disclosed in Patent Application Hei 11 (1999)-45513, the circuit of the SIG 50 shown in FIG. 4 may be provided in the IPIF 40, and each communication interface and the IPIF 40 may be directly connected to each other through the logical path of the ATMSW 10. By employing such a configuration, hardware can be shared between the SIG 50 and the IPIF 40, and the number of SIG 50 can be reduced. Therefore, the switching system can be configured economically.

As described above, the SIG 50 and the IPIF 40 used for the switching system of the invention are enabled to share hardware. Accordingly, by setting each different processing software, the switching system of the invention can be configured economically to have universality and flexibility. Specifically, software is downloaded to each communication network or SIG to set a necessary function and, at the time of installing the switching system or changing the configuration thereof, necessary software (file data) converted into an ATM cell is directly transmitted from the OMP 650 through the path P2 or P3 of the ATMSW 10 to each function block.

Figure 9:
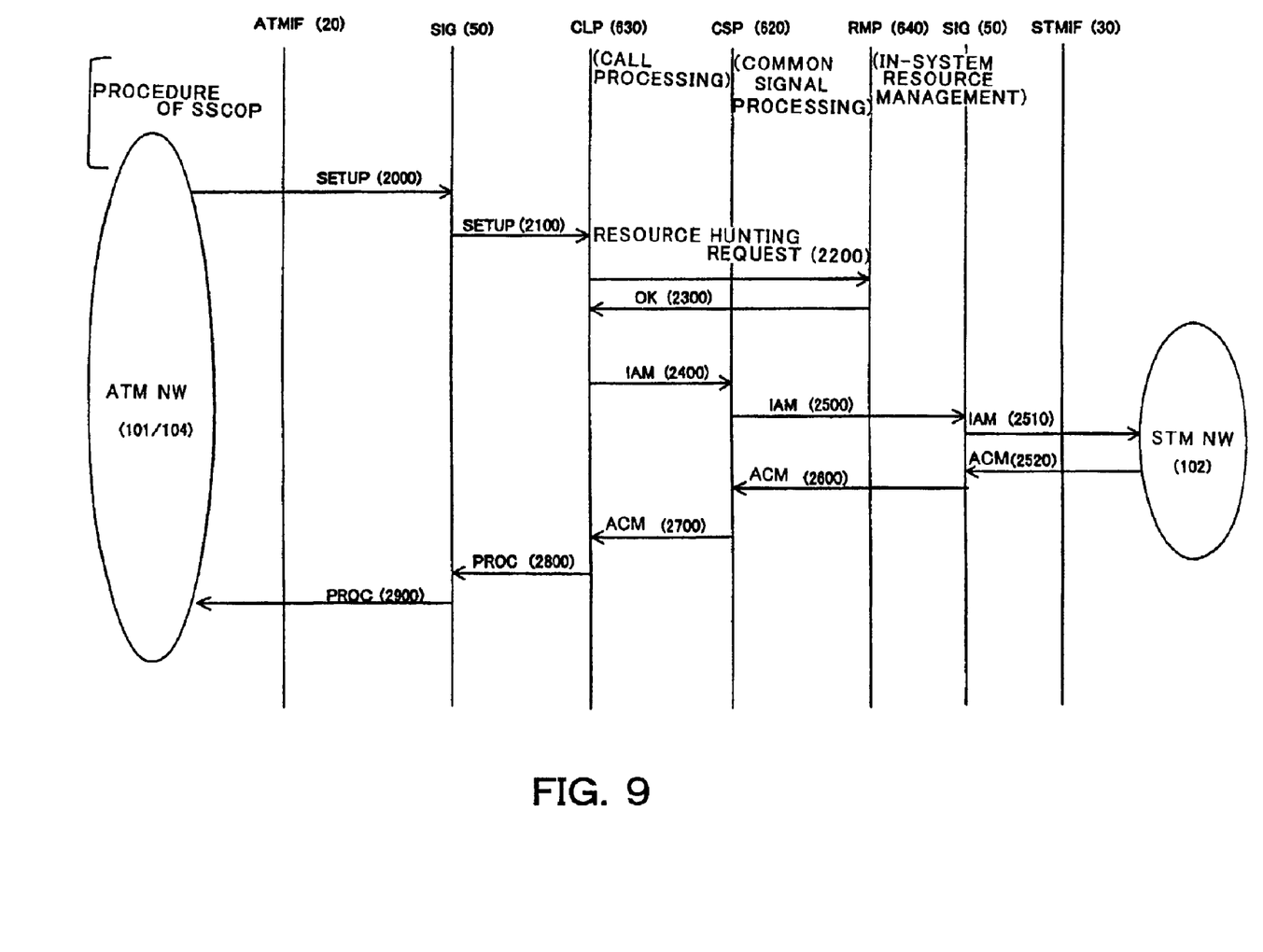
FIG. 9 is a sequential view showing an example of an operation of the switching system of the invention, which is suitable for processing multimedia.

FIG. 9 is a sequential view showing an example of an operation of the switching system of the invention, which is suitably used for processing multimedia. The drawing shows a call setting operation for switching multimedia by connecting the ATM communication network 101 (or the mobile communication network 104) and the STM communication network 102 to each other. In particular, explanation will be made of the operation of the switching system focusing on operations of the signal processor and a multiprocessor employed by the system of the invention.

(1) A call is originated from the ATM communication network 101 to the STM communication network 102. Then, the ATM communication network 101 (or the mobile communication network 104) transmits a control signal, e.g., a signaling ATM cell 2000 storing a SETUP message made in accordance with a procedure of the SSCOP, to the ATMIF 20 connected to the ATM communication network 101.

(2) The ATMIF 20 selects the SIG 50 for processing the control signal by performing rewriting or the like for a header of the ATM cell, and then transfers the control signal through the path (P1 in FIG. 3) of the ATMSW 10 to the SIG 50.

(3) The SIG 50 performs specified protocol processing for the control signal, converts the signal into an ATM cell (1100 in FIG. 3) having a format predetermined inside the switching system, and then transfers an ATM cell 2100 having a header destined to the processor CLP 630 predetermined based on instruction by the RMP 640 through the path (P2 in FIG. 3) of the ATMSW 10.

(4) Upon having received the control signal, the CLP 630 analyzes a content thereof, and links up with the other processors (operates as a multiprocessor) to hunt internal resources of the switching system necessary for switching control. Specifically, the CLP 630 operates as follows:

a) The CLP 630 makes a resource hunting request to the RMP 640 (resource hunting request 2200), and then receives an OK message 2300.

b) After having verified resource hunting in the OK message 2300, the CLP 630 converts the message into a control signal 2400 (e.g., an IAM message) for transferring the message to a next switching system (e.g., the ATM communication network 102 as a connection destination), and transfers the same to the CSP 620.

(c) The CSP 620 converts a control signal 2500 (e.g., an IAM signal) converted for the common signal network into an ATM cell 1100, selects the SIG 50 for processing a common signal (rewrites a header of the ATM cell), and then transfers the control signal 2500 converted into the ATM cell through the path (P2 in FIG. 3) of the ATMSW 10 to the SIG 50.

(5) The SIG 50 performs specified protocol processing for the control signal, converts the signal into an ATM cell (1100 in FIG. 3) having a format predetermined inside the switching system, and then transfers an ATM cell 2510 having a header destined to the STMIF 30 as a connection destination through the path (P1 in FIG. 3) of the ATMSW 10.

(6) The STMIF 30 converts the received ATM cell 2510 into one for the STM communication network 102, and then transmits the control signal to the same. Upon having received a response, the STMIF 30 converts the received response into an ATM cell, and then transfers an ATM cell 2520 (e.g., an ACM signal) having a header of the ATM cell for selecting the SIG 50 for processing the common signal through the path (P1 in FIG. 3) of the ATMSW 10 to the SIG 50.

(7) The SIG 50 performs specified protocol processing for the control signal, converts the signal into an ATM cell (1100 in FIG. 3) having a format predetermined inside the switching system, and then transfers an ATM cell 2600 (e.g., an ACM signal) having a header destined to the CSP 620 through the path (P2 in FIG. 3) of the ATMSW 10.

(8) After the CSP 620 has received a response signal from the STM communication network 102, the control processor 60 continues call processing like the following:

(a) After the ACM signal 2600 has been returned through the common signal network, the CSP 620 converts the ACM signal 2600 into an ACM message, and then transfers the control signal 2700 converted into the ATM cell (e.g., an ACM signal) to the CLP 630.

(b) The CLP 630 converts the ACM signal 2700 into a control signal PROC 2800 for the ATM communication network, selects the SIG 50 for processing the control signal 2800 (rewrites a header of the ATM cell), and then transfers the control signal 2800 converted into the ATM cell through the path (P2 in FIG. 3) of the ATMSW 10 to the SIG 50.

(9) The SIG 50 converts the PROC 2800 from the internal format of the switching system to a format (1000 in FIG.

3) for transmitting to the ATM communication network, and then transmits a signaling ATM cell 2900 storing the PROC message through the ATMSW 10 and the ATMIF 20 to the ATM communication network 101.

(10) Connection control in the switching system 1 is completed by performing the foregoing procedures and operations, and the ATM communication network and the STM communication network can be connected to each other. Specifically, the ATM cell (1000 in FIG. 3) containing user information from the ATM communication network 101 (or the mobile communication network 104) is switched from the ATMIF 20 through the path (P5 in FIG. 3) of the ATMSW 10 to the STMIF 30. The STMIF 30 takes out the user information from the ATM cell, and then transmits the user information to the STM communication network 102 in a specified time slot of the STM line. In a reverse case, similarly, after conversion has been finished for the STM signal and the ATM signal, the ATM cell is switched by the ATMSW 10, and then the user information from the STM communication network 102 is transmitted to the ATM communication network 101.

What is claimed is:

1. A communication apparatus for interconnecting plural kinds of communication networks including an asynchronous transfer mode (ATM) network to transfer information, said communication apparatus comprising:

plural kinds of first interfaces for converting plural kinds of control signals or communication signals having different signal formats from plural kinds of communication networks, except the ATM network, to ATM cells;

a second interface for receiving an ATM cell to which a control signal or a communication signal is inserted from the ATM network;

an ATM switch having a plurality of input ports and a plurality of output ports for outputting the ATM cell received by any one of the input ports from the first and second interfaces to anyone of the plurality of output ports based on header information of the ATM cell;

plural kinds of signal processors, connected to the ATM switch, for converting a signal output from the first and second interfaces to a signal format or protocol used by each of the plural kinds of communication networks; and a control part for receiving the ATM cell, which is output from one of the plural kinds of signal processors and to which the control signal is inserted through the ATM switch, and performing a necessary processing among plural kinds of processings to output the ATM cell to the ATM switch, wherein each of the first and second interfaces rewrites a destination of the received signal so that the received signal is transmitted to one of the plural kinds of signal processors based on the kind of received signal.

2. A communication apparatus according to claim 1, wherein said control part includes plural kinds of processors for executing different processing, and a second ATM switch connected to one of said plural kinds of processors for transferring inter-processor information to another one of said plural kinds of processors as the destination based on header information of the ATM cell, wherein said one of said plural kinds of processors outputs the ATM cell having a header destined to said another one of said plural kinds of the other processors performing necessary control to the second ATM switch, and said second ATM switch transmits the ATM cell to said another one of said plural kinds of processors as the destination.

3. A communication apparatus according to claim 1, wherein each of said signal processors forms the ATM cell having a header destined to anyone of the control part, the first interfaces and the second interface, and outputs the ATM cell.

4. A communication apparatus switching system according to claim 1, wherein each of said signal processors relays an IP packet converted into the ATM cell among the plural kinds of communication networks.

5. A communication apparatus switching system according to claim 1, wherein each of said signal processors converts the ATM cell based on a signal received through a common line, and then outputs the cell to one of the communication networks.

6. A communication apparatus switching system according to claim 1, wherein each said first and second interfaces converts control signal received from one of the communication networks into the ATM cell having a header destined to any one of the signal processors for performing signal processing, and outputs the ATM cell to the ATM switch.

* * * * *